United States Patent Office 2,878,642
Patented Mar. 24, 1959

2,878,642

HYDRAULIC COUPLING AND MEANS FOR CONTROLLING THE QUANTITY OF FLUID THEREIN

Jean Maurice and Michel Rist, Paris, France, assignors to Societe Anonyme Francaise du Ferodo, Paris, France, a corporation of France Application October 16, 1956, Serial No. 616,264

Claims priority, application France October 22, 1955

2 Claims. (Cl. 60—12)

The present invention relates to hydraulic transmissions such as couplings, torque converters and the like, in particular for automobile vehicles, in which the torque transmitted varies as a function of the engine speed under the action of a fluid. In order to obtain definite disengagement of the fluid coupling, especially when the engine is idling, provision may be made for draining-off the centrifuged fluid.

In certain conditions of use, this kind of measure is inadequate. For example, with a transmission arranged to be emptied at the normal idling speed of the engine, it is found that there is an undesirable re-filling at the fast idling speed due to the use of the engine choke at starting, hereinafter called choke idling speed.

The present invention has for its object a hydraulic transmission which is free from these drawbacks and which operates in the best possible manner in all circumstances as well as the operativeness and inoperativeness of the choke.

Forms of embodiment of the invention are described below by way of example, reference being made to the accompanying drawings, in which.

Figure 1:
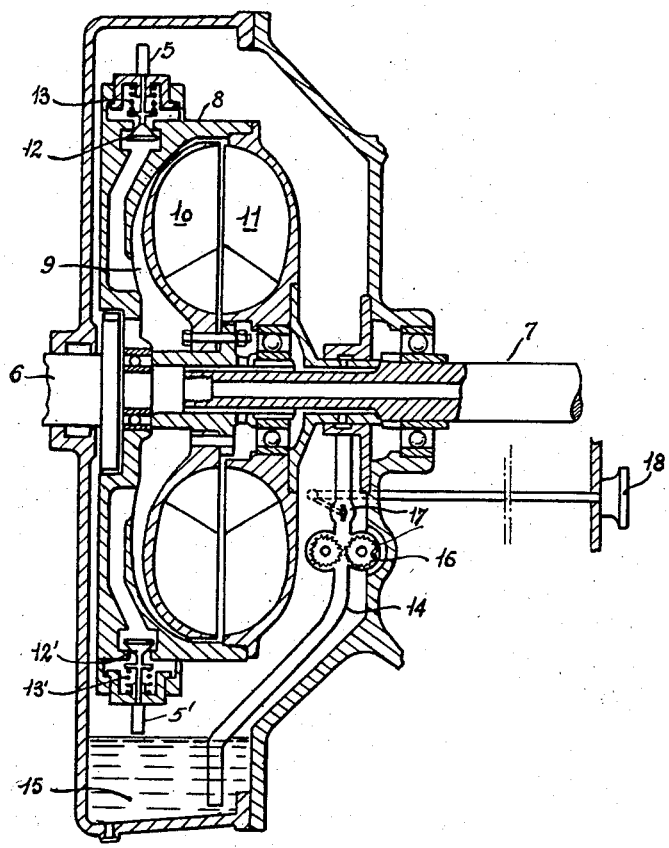
Fig. 1 is a view in longitudinal cross-section of a hydraulic coupling in accordance with the invention.

Reference will first of all be made to Fig. 1 which relates to a hydraulic coupling having a pump member 11 and a turbine member 10. The pump member 11 is secured to a casing 8 secured to the driving engine shaft 6, while the turbine member 10 is secured to the driven shaft 7. The casing 8 defines a work fluid chamber 9 with the members 10 and 11. As well known per se, means are provided to limit the torque developed between the members 10 and 11 of the coupling when the engine is idling. These means consist for example in modifying the quantity of active fluid working in the apparatus. To this end, a leakage valve 12, subjected to centrifugal force and to the action of an opposing spring 13 opens automatically an outlet 5 at the periphery of the casing 8 when the engine speed is in the vicinity of the idling speed, and this evacuates the active fluid into a reservoir 15, external to the chamber 9. The fluid is driven by forced circulation, so that it fills the chamber 9 again as soon as the leakage valve 12 closes due to acceleration of the engine.

In accordance with the invention, two sets of valves 12 and 12', controlling outlets 5 and 5' and mounted with springs 13 and 13' having different calibrations, are provided at the periphery of the casing 8. The valves 12 of the first set are open below a speed which substantially slightly exceeds the normal idling speed of the engine and are closed at speeds beyond this said speed, while the valves 12' of the second set are open below a speed which is substantially the choke idling speed and are closed beyond that speed. In combination with an arrangement of this kind, a pump 16 and a flow restricting valve 17 are provided on the piping system 14 which supplies the chamber 9 from the reservoir 15. The valve 17 is mounted on the downstream side of the pump 16 and is controlled from the choke 18 in such manner as to be open or half-closed, depending on whether the choke is inoperative or in use.

As now clearly set forth, the purpose of having two sets of valves which open at different speeds and of having a flow restricting valve which operates while choking the engine, is to insure an appropriate emptying of the work fluid chamber, as well if the choke is operative or inoperative during idling conditions, i. e., as understood, when the accelerator pedal is fully released.

The pump 16 is chosen so that, with the valve 17 open, the rate of flow through the piping 14 is greater than the rate of leakage flow through the valves 12' and less than the rate of leakage flow of the combination of the valves 12 and 12', while with the valve 17 half-closed, it is less than the rate of leakage flow through the valves 12'.

When the choke 18 is inoperative, the valve 17 is open. At the normal idling speed, the valves 12 and 12' are open. The chamber 9 empties itself. When the engine speed slightly exceeds the normal idling speed, the valves 12 close while the valves 12' remain open. The chamber 9 re-fills and remains filled still more positively at higher speeds once the valves 12' have closed in their turn.

When the choke 18 is in use, the valve 17 is half-closed. At the choke idling speed, the valves 12 are closed while the valves 12' are open. The chamber 9 empties itself. When the engine speed slightly exceeds the choke idling speed, the valves 12 remain closed while the valves 12' also close. The chamber 9 re-fills and remains filled at the higher speeds. More particularly the chamber 9 is emptied at the choke idling speed when the choke is operative.

The user thus has available similar conditions of operation of the coupling, whether the choke 18 is in the operative or inoperative position.

It is to be noted that a choke is often used while the engine is running, and more particularly in winter, and it is for that reason that applicant has provided means to empty the work fluid chamber while the engine speed is the choke idling speed when the choke is used.

Figure 2:
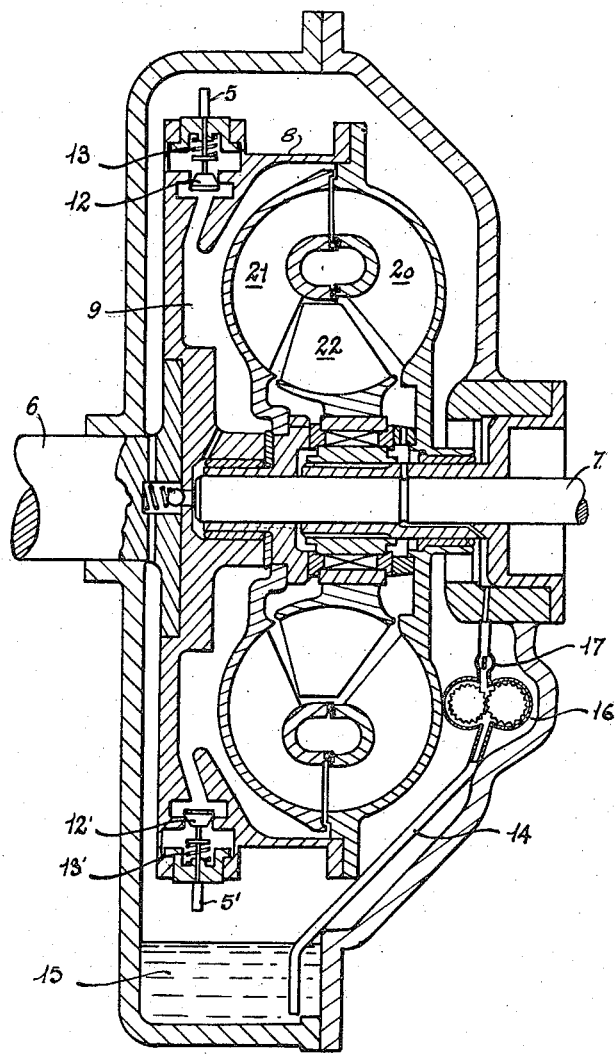
Fig. 2 is similar to Fig. 1, but relates to a hydraulic torque converter.

Reference will now be made to Fig. 2, in which the arrangement is similar to that which has just been described with reference to Fig. 1, but is concerned with an application of the invention to a hydraulic torque converter. In Fig. 2, there is seen at 20 the pump of the converter, at 21 the turbine and at 22 the reactor. There will be recognized at 12 and 12' the two sets of valves with the springs 13 and 13', at 15 the fluid reservoir, at 14 the supply piping to the converter from the casing 15, at 16 the pump mounted on the piping system 14, and at 17 the valve controlled by the choke.

The operation is similar to that which has been previously described with reference to Fig. 1.

What we claim is:

1. In a hydraulic transmission device for an automotive vehicle comprising a combustion engine, a driving engine shaft, a driven shaft, hydraulically coacting members rigid in rotation with said shafts respectively, a casing rigid in rotation with said engine shaft and defining a work fluid chamber with said members, a fluid reservoir, feeding means for feeding fluid to said chamber from said reservoir, a first fluid outlet means on said casing for restoring fluid from said chamber to said reservoir when open, a first centrifugally-actuated spring-loaded valve means cooperating with said outlet means to close said outlet means when the engine shaft speed is above the idling speed and to open said outlet means when the engine shaft speed is substantially the idling speed, and a choke control means for accelerating the engine shaft idling speed to a choke idling speed value, the combination with all said means of a second outlet means on said casing for restoring fluid from said chamber to said reservoir when open, a second centrifugally-actuated spring-loaded valve means cooperating with said second outlet means to close said second outlet means when the engine shaft speed is above the choke idling speed and to open said second outlet means when the engine shaft speed is below the choke idling speed, and flow restricting means on said feeding means actuated by said choke control means, whereby an emptying of the work chamber occurs at the idling speed when said choke control means is inoperative and at the choke idling speed when said choke ocntrol means is operative.

2. A hydraulic transmission device as defined in claim 1, wherein said feeding means includes pump means and said flow restricting means are located downstream of said pump means.

References Cited in the file of this patent

UNITED STATES PATENTS

| | | |
|---|---|---|
| 1,873,688 | Walker | Aug. 23, 1932 |
| 2,014,944 | Martyrer et al. | Sept. 17, 1935 |
| 2,689,458 | Weymann | Sept. 21, 1954 |